UNITED STATES PATENT OFFICE.

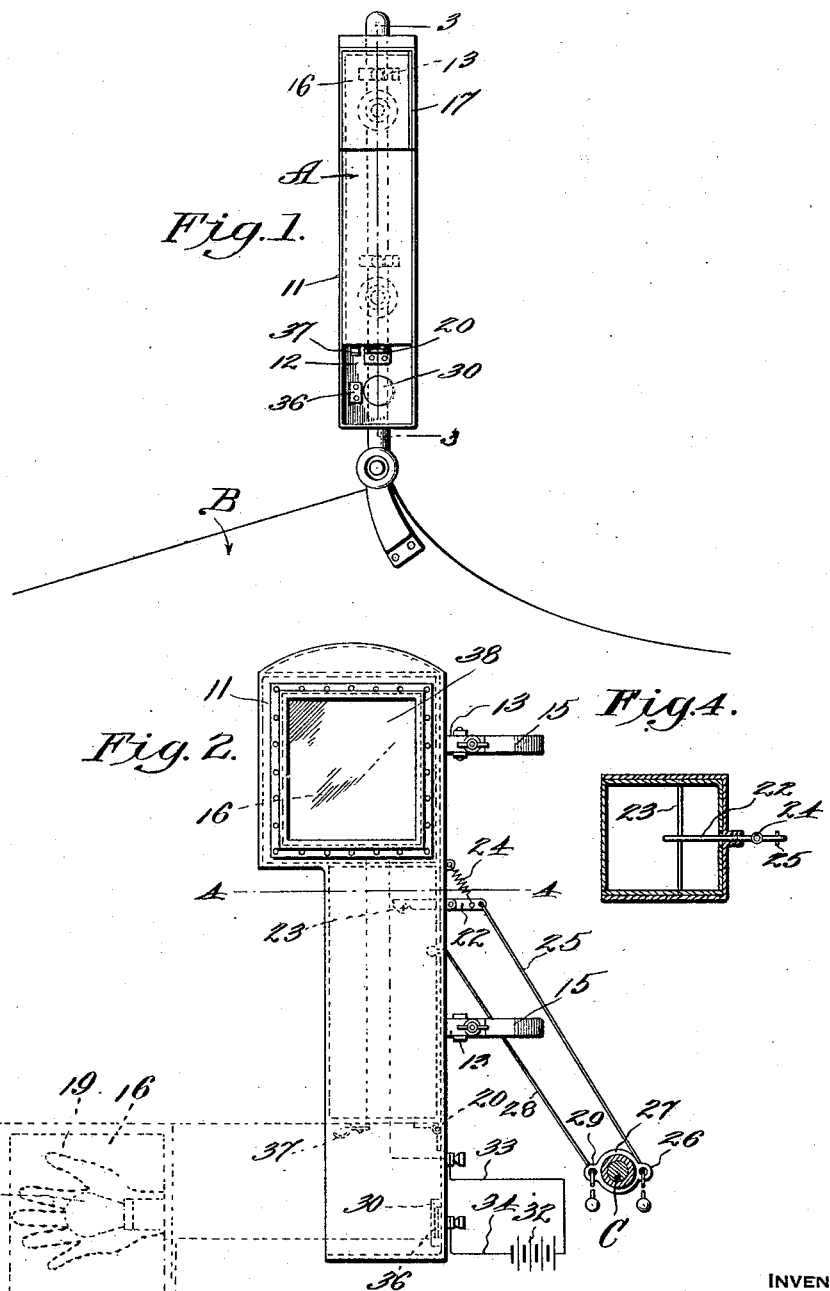

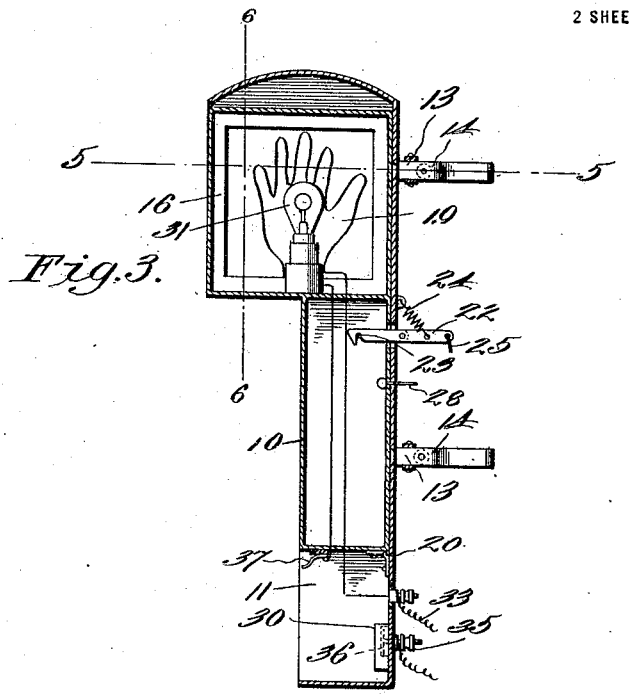
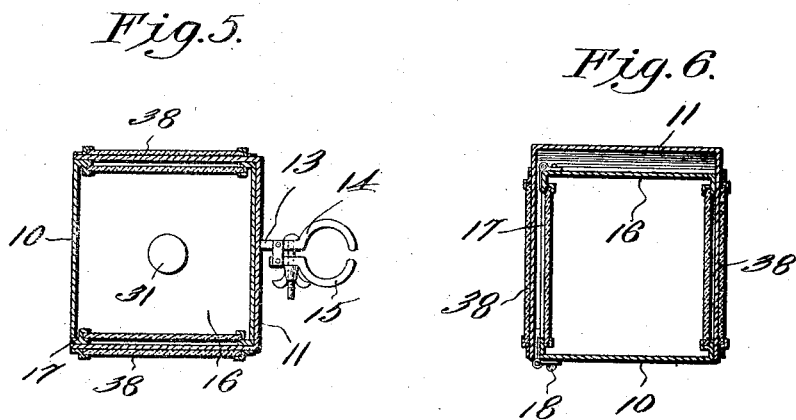

ROBERT H. ZIMMERMAN, OF LOCKPORT, NEW YORK.

DIRECTION-SIGNAL.

1,271,411.  Specification of Letters Patent.  Patented July 2, 1918.

Application filed November 21, 1916. Serial No. 132,650.

*To all whom it may concern:*

Be it known that I, ROBERT H. ZIMMERMAN, a citizen of the United States, residing at Lockport, in the county of Niagara and State of New York, have invented new and useful Improvements in Direction-Signals, of which the following is a specification.

This invention aims to provide a signaling device for automobiles and other vehicles, to indicate the driver's intention to stop, or the course the vehicle is about to pursue in turning corners, rounding curves, etc.

More specifically stated the invention embodies a signal arm adapted to be mounted upon an appropriate part of the vehicle, with a novel means by which the driver can conveniently lower the arm to its active or signaling position, as well as elevate the arm to its normal or inactive position.

In carrying out the invention I further provide means whereby the indicating arm is illuminated to be readily visible at night, the said means being operable upon movement of the arm to active or indicating position.

The nature and advantages of the invention will be better understood when the following description is read in connection with the accompanying drawings, the invention residing in the construction, combination and arrangement of parts as claimed.

In the drawings forming part of this specification like numerals of reference indicate similar parts in the several views and wherein:—

Figure 1 is a side elevation of a portion of an automobile showing the present invention applied thereto.

Fig. 2 is an elevation of the signal arm.

Fig. 3 is a sectional view taken on line 3—3 of Fig. 1.

Fig. 4 is a fragmentary sectional view along the line 4—4 of Fig. 2 of the means employed for holding the arm in vertical position.

Fig. 5 is a sectional view along the line 5—5 of Fig. 3, showing the housing for the indicator arm in detail.

Fig. 6 is a sectional view taken on line 6—6 of Fig. 3.

The device forming the subject matter of my invention is indicated generally at A, and embodies an indicator arm 10 normally positioned within the housing or casing 11, the latter being open at one side as at 12 to permit the arm to be moved from within the casing or housing to an active or signaling position. The device in its entirety is adapted for use in connection with automobiles indicated at B, or other vehicles, and can be arranged on an appropriate part of the machine. As shown in this particular instance however the device is mounted upon the left side of the wind shield of the vehicle through the instrumentality of the clamps 13 projecting from the housing 11. The clamps 13 preferably include a fixed jaw 14 and a movable jaw 15, capable of adjustment toward and away from the fixed jaw 14 whereby the clamp may accommodate itself to supports of varying dimensions with which it is adapted to be associated. It might here be stated that the housing or casing 11 is shaped to conform to the configuration of the indicator arm which it is adapted to receive.

The indicator arm 10 is provided at its upper end with a box or receptacle 16, the latter having a cover 17 which is held in closed position in any suitable manner such as at 18. While the component parts of the device may be constructed from any suitable material the cover 17 of the receptacle and its opposed wall is constructed from glass, preferably green in color, while on the cover 17 is painted or otherwise secured a figure representing a hand as at 19. The arm 10 is hingedly mounted within the housing or casing 11 at a point adjacent the lower extremity of the arm as at 20, whereby the arm is permitted a vertical swinging movement, and capable of assuming a horizontal active or signaling position.

The frame is normally held within the casing or housing 11 in a vertical position, by means of a hook-like element 22 pivoted at a point intermediate its ends upon the rear wall of the housing 11, the hook terminal projecting within the housing and adapted to engage a rod 23 carried by the arm 10. A retractile spring 24 has one end secured to the casing 11 and its opposite end to the projecting terminal of the element 22, the spring functioning to maintain the hook-like element in engagement with the rod 23 for the purpose above stated. One end of a flexible element 25 is secured to the projecting terminal of the hook 22, the flexible element 25 being threaded through a loop 26 of a clamp 27 secured upon the steering post C of the vehicle. This arrangement manifestly holds the flexible element 25 in convenient reach of the driver, it of course being understood that a pull upon the flexible element 25 will disengage the hook-like element 22 from the rod 23, thereby effecting a release of the indicator arm, permitting the latter to gravitate to a horizontal position, in which position the arm is readily visible to pedestrians and drivers of other machines, and indicates a change in the course of the vehicle or the driver's intention to stop the vehicle. Subsequent to the use of the arm the latter may be readily and easily elevated to its normal position within the casing or housing 11, by exerting a pull upon the flexible element 28, which latter has one end secured to the arm 10 and its opposite extremity threaded through a loop 29 formed upon the clamp 27. Secured within the casing or housing 11 is a bumper 30 positioned to be engaged by the arm to absorb the jar incident to the fall of the arm to its horizontal position.

With a view of illuminating the box 16 in order to render the signal arm readily visible in the dark, I arrange an electric bulb 31 within said box and connect the same to a suitable source of supply such as a battery or the like indicated at 32. The conducting wires 33 and 34 respectively may be arranged in any suitable manner, preferably in the manner shown, the wire 34 being associated with the binding post 35 of the fixed contact 36 arranged within the housing or casing 11. A movable contact 37 is carried by the lower end of the arm 10 and is adapted to be brought into engagement with the fixed contact 36 when the arm assumes a horizontal or active position, whereupon the light 31 will be illuminated. When the arm 10 is elevated to normal position within the casing, the circuit is broken and the light accordingly extinguished. If desired one side of the housing or casing 11 may be provided with a mirror 38. It is also to be understood that the device may be made with or without the illuminating means.

While it is believed that from the foregoing description the nature and advantages of the invention will be apparent, I desire to have it understood that what is herein shown and described is merely illustrative of the preferred embodiment of the invention to which I do not limit myself and that such changes may be resorted to when desired as fall within the scope of what is claimed.

What is claimed is:—

1. An auto direction signal comprising a casing open at one side, a vertically swinging signal arm disposed within and conforming to said casing, a hinge connecting the rear wall of said casing with the adjacent lower edge of said arm, a latch member pivoted upon and extending into said casing, a catch member on said arm engaged by said latch member, a spring normally holding said latch member in engagement with said catch, and a flexible member connected with the exterior end of said latch member whereby said latch member may be moved out of engagement with said catch to permit said arm to gravitate to a horizontal position.

2. A direction signal comprising a casing open at one side, a signal arm conforming to said casing and hinged upon the back wall thereof at its lower rear edge, a spring pressed latch member extending into said casing and engaging said arm, a flexible member connected with said latch member whereby said latch member may be moved out of engagement with said arm, the upper end of said arm being overbalanced whereby release of said latch member will permit said arm to gravitate to a horizontal position, and a bumper secured upon the rear wall of said casing below the lower end of said arm and engaged thereby when said arm drops to its horizontal position.

3. An auto direction signal comprising a casing open at one side, a signal arm formed as a hollow cell conforming to and disposed within said casing, a hinge connection at the line of juncture of the lower rear edge of said shell with the back wall of said casing a transverse rod within said shell, a latch member pivoted upon and extending into said casing and engaging said transverse rod, the upper portion of said shell being overbalanced whereby said shell will gravitate to a horizontal position when said latch member is released from engagement with said transverse bar, means for releasing said latch member, and a flexible member connected with said shell and extending through the back wall of said casing whereby said shell may be returned to its initial position within said casing.

In testimony whereof I affix my signature.

ROBERT H. ZIMMERMAN.

Copies of this patent may be obtained for five cents each, by addressing the "Commissioner of Patents, Washington, D. C."